United States Patent
An et al.

(10) Patent No.: US 9,479,002 B2
(45) Date of Patent: *Oct. 25, 2016

(54) BATTERY PACK

(71) Applicant: SAMSUNG SDI CO., LTD., Yongin-si, Gyeonggi-do (KR)

(72) Inventors: Jin-Hong An, Yongin-si (KR); Watson Doh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 96 days.

This patent is subject to a terminal disclaimer.

(21) Appl. No.: 14/045,714

(22) Filed: Oct. 3, 2013

(65) Prior Publication Data

US 2014/0035534 A1    Feb. 6, 2014

Related U.S. Application Data

(63) Continuation of application No. 12/888,179, filed on Sep. 22, 2010, now Pat. No. 8,593,112.

(60) Provisional application No. 61/257,789, filed on Nov. 3, 2009.

(51) Int. Cl.
*H02J 7/00* (2006.01)
*H01M 10/42* (2006.01)
(Continued)

(52) U.S. Cl.
CPC ............ *H02J 7/0068* (2013.01); *H01M 10/42* (2013.01); *H01M 10/4257* (2013.01); *H01M 10/44* (2013.01); *H01M 10/46* (2013.01); *H02J 7/0031* (2013.01)

(58) Field of Classification Search
USPC .................................................. 320/134–136
See application file for complete search history.

(56) References Cited

U.S. PATENT DOCUMENTS 5,065,082 A * 11/1991 Fushiya ....................... 320/110
5,789,900 A    8/1998 Hasegawa et al.
6,133,711 A   10/2000 Hayashi et al.
(Continued)

FOREIGN PATENT DOCUMENTS

CN    1945924 A    4/2007
JP    05-074384    3/1993
(Continued)

OTHER PUBLICATIONS

SIPO Office action dated Jun. 12, 2014, with English translation, for corresponding Chinese Patent application 201010536250.9, (15 pages).

(Continued)

*Primary Examiner* — Samuel Berhanu
(74) *Attorney, Agent, or Firm* — Lewis Roca Rothgerber Christie LLP

(57) ABSTRACT

Battery pack circuits are provided. In one embodiment, the invention relates to a battery pack including a rechargeable battery including a first battery terminal and a second battery terminal coupled to a common terminal, a discharge control switch coupled between the first battery terminal and a first discharging terminal, a charge control switch coupled between the first discharging terminal and a first charging terminal, wherein the battery pack is configured to provide a current to a load coupled between the first discharging terminal and the common terminal, and a processing circuitry configured to charge and discharge the battery by controlling the discharge control switch and the charge control switch.

18 Claims, 5 Drawing Sheets

(51) Int. Cl.
*H01M 10/44* (2006.01)
*H01M 10/46* (2006.01)

(56) References Cited

U.S. PATENT DOCUMENTS

| | | | |
|---|---|---|---|
| 6,489,749 B1* | 12/2002 | Nakashimo et al. | 320/134 |
| 2006/0181244 A1 | 8/2006 | Luo et al. | |
| 2007/0075684 A1* | 4/2007 | Liu et al. | 320/128 |
| 2007/0145947 A1* | 6/2007 | Sakurai et al. | 320/132 |
| 2007/0210751 A1 | 9/2007 | Wang et al. | |

FOREIGN PATENT DOCUMENTS

| | | |
|---|---|---|
| JP | 2009-089468 A | 4/2009 |
| KR | 10-2005-0097615 | 10/2005 |
| KR | 10-2007-0105220 A | 10/2007 |
| KR | 10-2009-0014897 | 2/2009 |

OTHER PUBLICATIONS

Korean Intellectual Property Office; English Translation of Korean Non-Final Office action dated Jan. 5, 2012 for corresponding Application No. 10-2010-0098825; 3 Pages.
Korean Office Action dated Jan. 5, 2012 issued in Korean Application No. 10-2010-0098825, 4 pages.
English Translation of JP 2009-089468 A, 59 pages.
European Search Report dated Feb. 16, 2011, for corresponding European Patent application 10251868.5.
SIPO Office action dated Nov. 15, 2013, with English translation, for corresponding Chinese Patent application 201010536250.9, (19 pages).
SIPO Office action dated Dec. 18, 2014, with English translation, for corresponding Chinese Patent application 201010536250.9, (16 pages).
SIPO Office action dated May 7, 2015, with English translation, for corresponding Chinese Patent application 201010536250.9, (17 pages).

* cited by examiner

BATTERY PACK

RELATED APPLICATIONS

This application is a continuation of U.S. patent application Ser. No. 12/888,179, filed Sep. 22, 2010, which issued as U.S. Pat. No. 8,593,112 on Nov. 26, 2013, and which claims priority to and the benefit of U.S. Provisional Application No. 61/257,789, filed on Nov. 3, 2009, the entire content of both of which is incorporated herein by reference.

BACKGROUND

1. Field

Embodiments of the present invention relate to battery packs, and more particularly, to charging and discharging of the battery packs.

2. Description of the Related Art

Rechargeable batteries, unlike primary batteries, are chargeable and dischargeable, and are widely used in high-end electronic devices such as cellular phones, notebook computers, or camcorders. In addition, rechargeable batteries are also used as a battery for electric vehicles such as scooters or automobiles. For high power applications, a plurality of rechargeable battery cells are assembled together in a battery pack. Conventional charging and discharging circuits are used to charge and discharge battery packs. However, conventional charging and discharging circuits have limitations.

SUMMARY

Aspects of the invention relate to battery pack circuits. In one embodiment, the invention relates to a battery pack including a rechargeable battery including a first battery terminal and a second battery terminal coupled to a common terminal, a discharge control switch coupled between the first battery terminal and a first discharging terminal, a charge control switch coupled between the first discharging terminal and a first charging terminal, wherein the battery pack is configured to provide a current to a load coupled between the first discharging terminal and the common terminal, and a processing circuitry configured to charge and discharge the battery by controlling the discharge control switch and the charge control switch.

In another embodiment, the invention relates to a method for charging and discharging a rechargeable battery of a battery pack, the method including switching-on a charge control switch to charge the battery, the charge control switch coupled between a first charging terminal and a discharge control switch coupled to a first battery terminal of the battery, wherein a charging current flows through the charge control switch and the discharge control switch while charging the battery, switching-on the discharge control switch and switching off the charge control switch to discharge the battery, wherein a discharging current does not flow through the charge control switch while discharging the battery.

In further embodiment, the invention relates to a method for discharging a rechargeable battery of a battery pack, the method including switching-off a charge control switch coupled between a charging device and a discharge control switch coupled to a first battery terminal of the battery, and switching-on the discharge control switch, wherein the battery is configured to supply a load coupled to a first discharging terminal and a second battery terminal of the battery, wherein the first discharging terminal is located between the charge control switch and the discharge control switch.

BRIEF DESCRIPTION OF THE DRAWINGS

These and other aspects will become apparent and more readily appreciated from the following description of the embodiments, taken in conjunction with the accompanying drawings of which.

DETAILED DESCRIPTION

Figure 1:
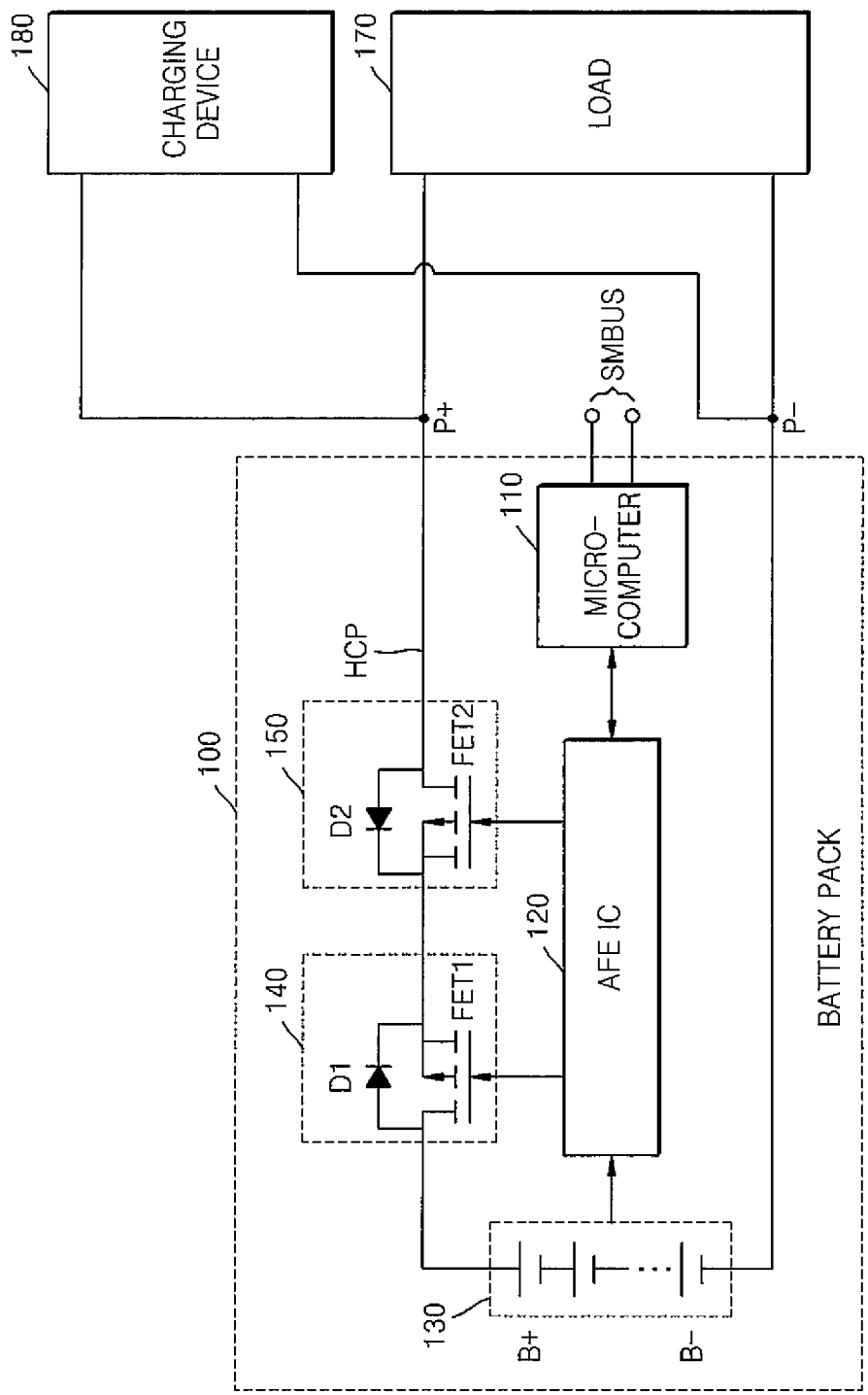
FIG. 1 is a circuit diagram of a conventional battery pack.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Also, as used in this specification (including the appended claims), the term "switch" is defined to include a transistor (e.g., a field effect transistor (FET)) having a parasitic diode coupled in parallel thereto.

FIG. 1 is a circuit diagram of a conventional battery pack 100. Referring to FIG. 1, the general battery pack 100 includes a chargeable battery cell 130 and a protection circuit. The battery pack 100 is installed at an external system (not shown) such as portable personal computer (PC, e.g., a notebook computer) and charges and discharges the battery cell 130.

The battery pack 100 includes the battery cell 130, external charging and discharging terminals P+ and P− connected in parallel to the battery cell 130, and the protection circuit including a charging element 140 and a discharging element 150 connected in series to a high current path (HCP) that is formed between the battery cell 130 and the external charging and discharging terminals P+ and P−, and an analog front end (AFE) integrated circuit (IC) 120 and a microcomputer 110 that are connected in parallel to the battery cell 130, the charging element 140, and the discharging element 150.

As illustrated in FIG. 1, the general battery pack 100 has a single charging and discharging path. The general battery pack 100 has a structure in which a load 170 and a charging device 180 are connected to the external charging and discharging terminals P+ and P−. In more detail, during a discharging operation, the battery pack 100 supplies power to terminals P+ and P− such as a mobile phone or a notebook computer acting as the load of the external system, via both the charging element 140 and the discharging element 150 in the battery cell 130. During a charging operation, the battery pack 100 performs charging by using the discharging element 150 and the charging element 140 via the terminals P+ and P− or while being connected directly to the charging device 180. In this case, charging or discharging is performed via one of the external charging and discharging terminals P+ and P− so that charging or discharging may be easily performed with a simple mechanical configuration. There is a small difference between the charging current and the discharging current in portable electronic devices such as a mobile phone and a notebook computer. Thus, a field effect transistor (FET) used for the charging element may have an allowable current (e.g., current rating) that is the same as or similar to a FET that is used for the discharging element 140, and a price difference thereof is also not large.

However, in the case of an electrical moving body such as an electric bike, an electric scooter, an electric wheelchair, and a motor-operated cart, there is a significant difference between the charging current and the discharging current. For example, in the case of the electric bike, the charging current is about 1.5 to about 2.0 A, and the discharging current is 10 A (average) and 20 A (maximum). In such case, there is a large difference between the charging current and the discharging current. Also, in the case of the electric scooter, the discharging current is 30 A (average) and 80 A (maximum), and thus there is much larger difference between the discharging current and the charging current. Thus, when a battery pack having a single charging and discharging path is used, as in related art, the FET for charging has to have a high allowable current rating that is similar to the rating for the FET for discharging.

Figure 2:
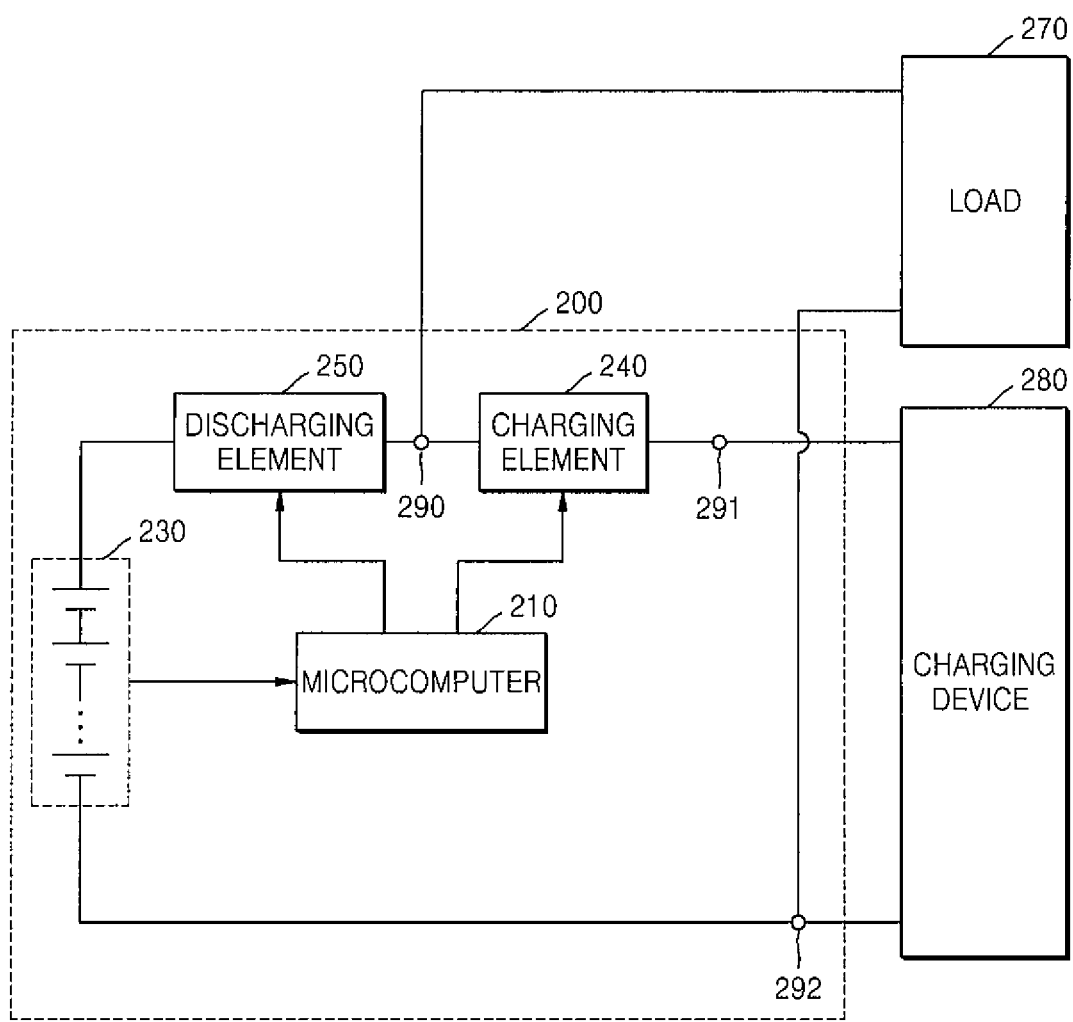
FIG. 2 is a circuit diagram of a battery pack illustrating the connection relationship between a battery pack, a load, and a charging device, according to an embodiment of the present invention.

FIG. 2 is a circuit diagram of a battery pack 200 illustrating the connection relationship between the battery pack 200, a load 270, and a charging device 280, according to an embodiment of the present invention. Referring to FIG. 2, the battery pack 200 according to the present embodiment includes a microcomputer 210, a battery cell 230, a charging element 240, a discharging element 250, a discharging terminal 290, a charging terminal 291, and a charging and discharging terminal 292 (e.g., common terminal). Also, the battery pack 200 further includes a load 270 that is connected to the battery pack 200 via the discharging terminal 290 and the charging and discharging terminal 292. The charging device 280 is connected to the battery pack 200 via the charging terminal 291 and the charging and discharging terminal 292.

Although not shown, the battery pack 200 may further include a current detector that is connected in series to a HCP formed between the battery cell 230 and the discharging terminal 290 and connected to the microcomputer 210, and a temperature detector that detects the temperature of the battery cell 230, and a self protection controller that blows a fuse located in the HCP according to control signals generated by the microcomputer 210 or an external system (not shown). The microcomputer 210 turns off the charging element 240 and the discharging element 250 or blows the fuse to prevent over-charging or over-discharging of the battery cell 230 when it is determined that the battery cell 230 is in an overcharged state or an over-discharged state. Also, the microcomputer 210 may include a system management BUS (SMBUS) for communication with the external system.

The battery cell 230 is a secondary battery cell that may be charged and discharged. In FIG. 2, B+ and B− denote high current terminals of the battery cell 230, e.g., power supply terminals of the battery cell 230. The battery cell 230 provides various information about the battery cell 230, such as temperature and a charging voltage of the battery cell 230, to the microcomputer 210.

The discharging element 250 is connected between the battery cell 230 and the discharging terminal 290. The discharging element 250 performs a switching function for discharging the battery cell 230 and prevents over-discharging when it is turned off according to control signals generated by the microcomputer 210 when the battery cell 230 is over-discharged. The discharging element 250 may include an FET. However, the discharging element 250 may be an electric element that performs a different type of switch function. Through this configuration, when the load 270 is connected to the discharging terminal 290 and the charging and discharging terminal 292, a discharging path from the battery cell 230 to the load 270 is formed by the battery cell 230, the discharging element 250, the discharging terminal 290, and the load 270, and a current is supplied from the battery pack 200 along the discharging path. Thus, the charging element 240 is not included in the discharging path so that the charging element 240 may be a switch element having a lower current rating than the current rating of the discharging element 250. In other words, even when a comparatively large discharging current flows to the load 270, the charging element 240 may be implemented without regard to the magnitude of the discharging current.

The charging element 240 is connected between the discharging terminal 290 and the charging terminal 291. The charging element 240 performs a switching function for charging the battery cell 230 and prevents over-charging when it is turned off according to control signals generated by the microcomputer 210 when the battery cell 230 is over-charged. Like the discharging element 250, the charging element 240 may include an FET. However, the charging element 240 may be an electric element that performs a different type of switch function. Through this configuration, when the charging device 280 is connected to the charging terminal 291 and the charging and discharging terminal 292, a charging path from the charging device 280 to the battery cell 230 is formed by the charging device 280, the charging terminal 291, the charging element 240, the discharging terminal 290, the discharging element 250, and the battery cell 230.

The microcomputer 210 controls the discharging element 250 and the charging element 240 to perform charging and discharging functions of the battery pack 200 and to thereby prevent over-charging and over-discharging. When the load 270 is connected to the discharging terminal 290 and the charging and discharging terminal 292, the microcomputer 210 may turn on the discharging element 250 to discharge the battery cell 230. Also, when the charging device 280 is connected to the charging terminal 291 and the charging and discharging terminal 292, the microcomputer 210 may turn on the charging element 240 and the discharging element 250 to charge the battery cell 230. Also, when the microcomputer 210 measures a voltage of the battery cell 230 and determines that over-discharging to the load 270 is occurring, the microcomputer 210 may turn off the discharging element 250 to prevent over-discharging. Also, when the microcomputer 210 determines that over-charging from the charging device 280 is occurring, the microcomputer 210 may turn off the charging element 240 to prevent over-charging.

Based on the configuration of the battery pack 200, the load 270, and the charging device 280, when there is a large difference between a charging current and a discharging current in the load 270 such as an electric moving body, during a discharging operation, the discharging current does not flow through the charging element 240. In such case, the charging element 240 may be a switching element that does not need a high current rating like that of the discharging element 250.

Also, in FIG. 2, the discharging element 250 and the charging element 240 are located along the HCP at the positive side of the battery cell 230. However, the discharging element 250 and the charging element 240 may also be located along the HCP at the negative side of the battery cell 230.

Figure 3:
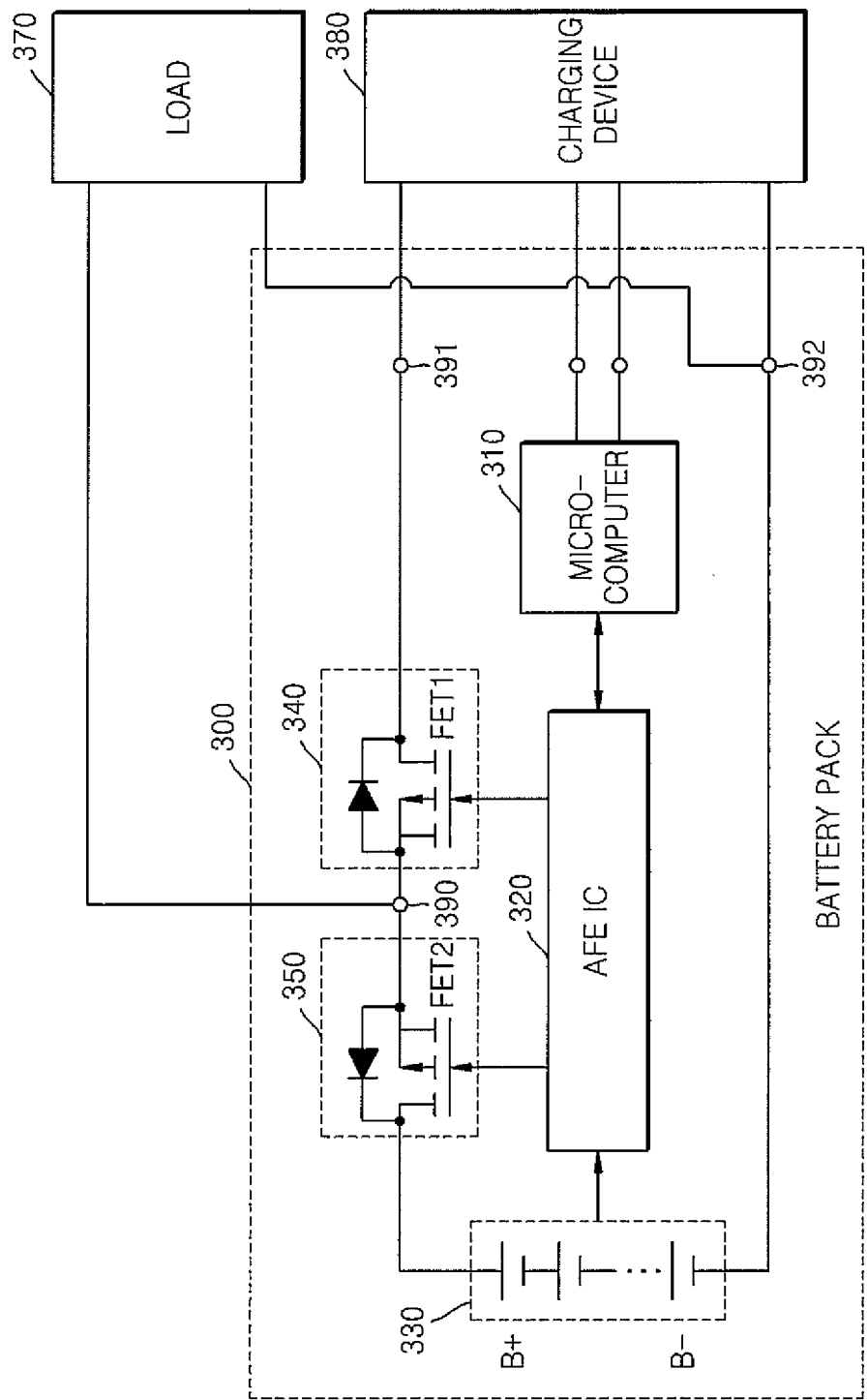
FIG. 3 is a circuit diagram of a battery pack illustrating the connection relationship between a battery pack, a load, and a charging device, according to another embodiment of the present invention.

FIG. 3 is a circuit diagram of a battery pack 300 illustrating the connection relationship between the battery pack 300, a load 370, and a charging device 380, according to another embodiment of the present invention. Referring to FIG. 3, the battery pack 300 according to the present embodiment includes a microcomputer 310, an AFE IC 320, a battery cell 330, a charging element 340, a discharging element 350, a discharging terminal 390, a charging terminal 391, and a charging and discharging element 392. The battery pack 300 further includes the load 370 that is connected to the battery pack 300 via the discharging terminal 390 and the charging and discharging terminal 392, and the charging device 380 that is connected to the battery pack 300 via the charging terminal 391 and the charging and discharging terminal 392. The difference between FIGS. 2 and 3 is that the battery pack 300 includes the AFE IC 320 that controls the discharging element 350 and the charging element 340 and detects a voltage from the battery cell 330, and a charging FET FET1 and a discharging FET FET2 that constitute the charging element 340 and the discharging element 350, respectively.

When the charging device 380 is connected to the battery pack 300 via the charging terminal 391 and the charging and discharging terminal 392, the AFE IC 320 sets the charging FET FET1 of the charging element 340 to be in an on state and the discharging FET FET2 of the discharging element 350 to be in the on state so that the battery cell 330 may be charged. Similarly, when the load 370 is connected to the battery pack 300 via the discharging terminal 390 and the charging and discharging terminal 392, the AFE IC 320 sets the discharging FET FET2 of the discharging element 350 to be in the on state so that the battery cell 330 may be discharged. The AFE IC 320 controls switching operations of the charging FET FET1 for the charging element 340 and the discharging FET FET2 for the discharging element 350 according to control signals generated by the microcomputer 310.

As described above with reference to FIG. 2, the load 370 connected to the battery pack 300 may be a load in which the discharging current is larger than the charging current, and may be an electric moving body such as an electric bike or an electric scooter. Thus, the charging FET FET1 is not positioned in the discharging path. Thus, a comparatively large current, for example, current of several amps does not flow through the charging FET FET1. Thus, the charging FET FET1 may be an FET that has a low current rating. For example, the discharging FET FET2 may be an FET that has an allowable current (e.g., current rating) of 20 A, and the charging FET FET1 may be an FET that has an allowable current (e.g., current rating) of 2 A.

The source and drain of the charging FET FET1 (e.g., the charging element 340) are positioned opposite to the source and drain of the discharging FET FET2 (e.g., the discharging element 350). More specifically, the source of the charging FET FET1 (e.g., the charging element 340) is coupled to the source of the discharging FET FET2 (e.g., the discharging element 350). Using this configuration, the charging FET FET1 (e.g., the charging element 340) is configured to limit flow of current from the charging device 380 to the battery cell 330. On the other hand, the discharging FET FET2 (e.g., the discharging element 350) is configured to limit flow of current from the battery cell 330 to the load 370. Here, the FETs FET1 and FET2 are turned on or off according to control signals of the AFE IC 320, e.g., a switch control signal at a high level or a low level.

The AFE IC 320 is connected to the battery cell 330, the charging element 340, and the discharging element 350 and is connected in series between the battery cell 330 and the microcomputer 310. The AFE IC 320 detects a voltage of the battery cell 330, transmits the detected voltage to the microcomputer 310, and controls switch operations of the charging FET FET1 and the discharging FET FET2 according to control signals provided by the microcomputer 310.

In more detail, when the charging device 380 is connected to the battery pack 300 via the charging terminal 391 and the charging and discharging terminal 392, the AFE IC 320 sets the charging FET FET1 (e.g., the charging element 340) to be in an on state and the discharging FET FET2 (e.g., the discharging element 350) to be in the on state so that the battery cell 330 may be charged. Similarly, when the load 370 is connected to the battery pack 300 via the discharging terminal 390 and the charging and discharging terminal 392, the AFE IC 320 outputs a control signal that is used to set the discharging FET FET2 (e.g., the discharging element 350) to be in the on state so that the battery cell 330 may be discharged.

The microcomputer 310 is an IC that is connected in series between the AFE IC 320 and the external system. The microcomputer. 310 controls the charging element 340 and the discharging element 350 via the AFE IC 320 so as to prevent over-charging, over-discharging, and overcurrent of the battery cell 330. In other words, the microcomputer 310 compares a voltage of the battery cell 330 that is received via the AFE IC 320 with a voltage that is at a level that is set in the microcomputer 310 (e.g., a preselected voltage), outputs a control signal that is generated according to the result of the comparison to the AFE IC 320, and, if necessary, turns off the charging element 340 and the discharging element 350, thereby preventing over-charging, over-discharging, and overcurrent of the battery cell 330.

When the microcomputer 310 determines that the battery cell 330 is in an over-discharged state, it outputs a control signal that is generated according to the result of such determination to the AFE IC 320, thereby turning off the discharging FET FET2 (e.g., the discharging element 350), and any discharge to the load 370 from the battery cell 330 may be prevented. Although not shown, the battery pack 300 may further include a parasitic diode connected in parallel to the discharging FET FET2 (e.g., the discharging element 350) so that, even when the discharging FET FET2 (e.g., the discharging element 350) is turned off, a charging function of the battery cell 330 may be performed.

Figure 4:
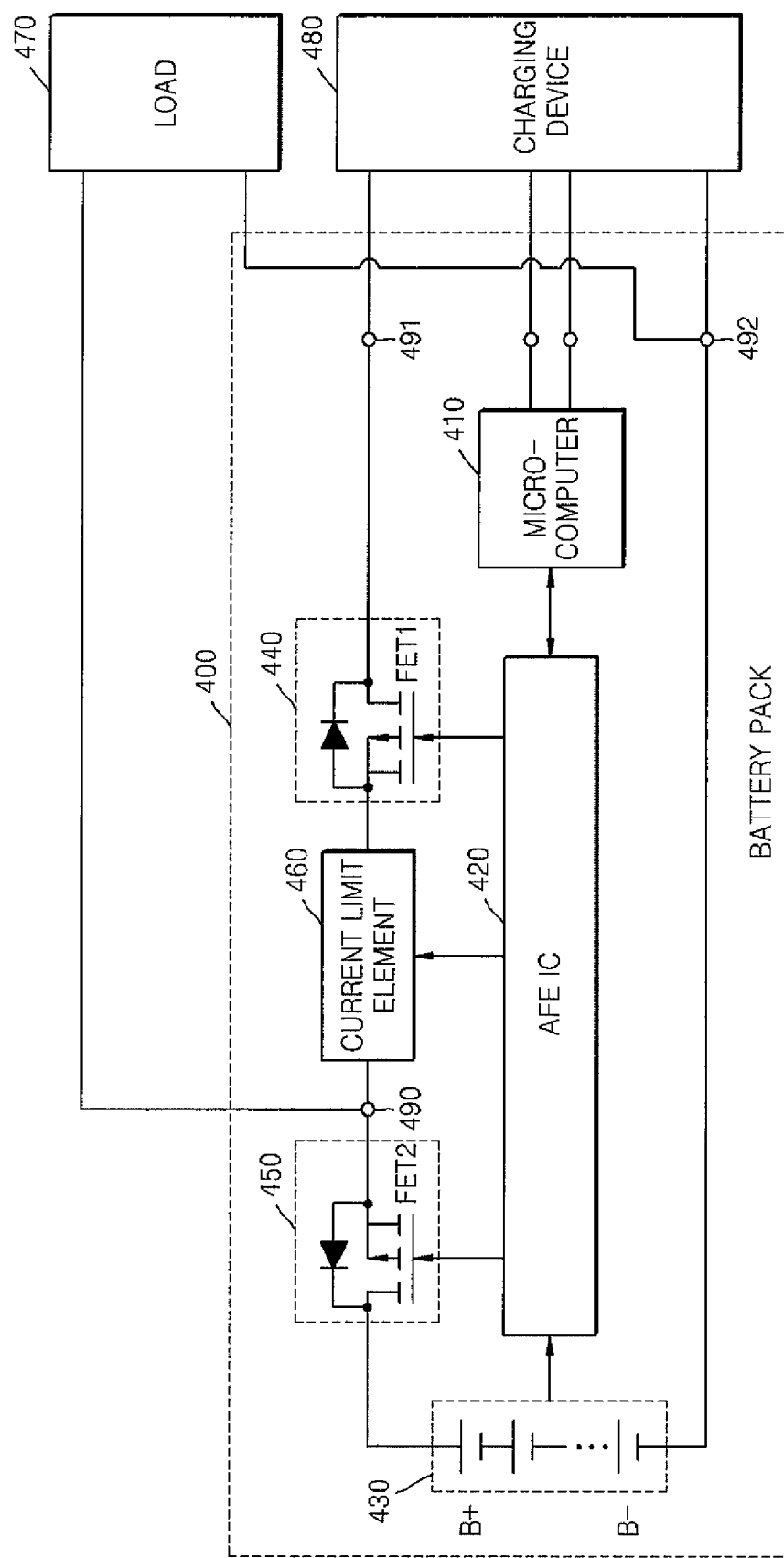
FIG. 4 is a circuit diagram of a battery pack illustrating the connection relationship between a battery pack, a load, and a charging device, according to another embodiment of the present invention.

FIG. 4 is a circuit diagram of a battery pack 400 illustrating the connection relationship between the battery pack 400, a load 470, and a charging device 480, according to another embodiment of the present invention. Referring to FIG. 4, the battery pack 400 includes a microcomputer 410, an AFE IC 420, a battery cell 430, a charging element 440, a discharging element 450, a current limit element 460, a discharging terminal 490, a charging terminal 491, and a charging and discharging terminal 492. Also, the battery pack 400 is coupled to the load 470 via the discharging terminal 490 and the charging and discharging terminal 492. The battery pack 400 is further coupled to the charging device 480 via the charging terminal 491 and the charging and discharging terminal 492. The primary difference between the embodiments illustrated in FIGS. 3 and 4 is that the battery pack 400 further includes the current limit element 460 that is disposed between the discharging terminal 490 and the charging element 440. As such, descriptions of the structure and function for the same portions as the battery pack 300 of FIG. 3 will not be provided here, and only the current limit element 460 will now be described.

The current limit element 460 is connected between the discharging terminal 490 and the charging element 440. Here, when the load 470 is connected to the discharging terminal 490 and the charging and discharging terminal 492 and a discharging current flows to the load 470 from the battery cell 430, the current limit element 460 cuts off flow of any discharging current to the charging element 440. The current limit element 460 may be a diode or a switch.

In the case where the current limit element 460 is a diode, the current limit element 460 is connected between the discharging terminal 490 and the charging element 440 and may cut off the flow of discharging current to the charging element 440. Thus, the diode cuts off the flow of the discharging current to the charging element 440 while allowing the charging current to flow to the battery cell 430 via the discharging element 450.

In the case where the current limit element 460 is a switch, the current limit element 460 is connected between the discharging terminal 490 and the charging element 440, as described above. The current limit element 460 is turned on or off according to control signals provided by the AFE IC 420. When the load 470 is connected to the discharging terminal 490 and the charging and discharging terminal 492 and the discharging current flows to the load 470 from the battery 430, the switch is turned off and cuts off flow of the discharging current to the charging element 440. However, during a charging operation, the switch is turned on and allows a charging current to flow through the charging element 440 and the discharging element 450 to the battery cell 430. Here, the switch may be an FET or another suitable electric element that performs a switching function.

In FIG. 4, a discharging path includes the battery cell 430, the discharging element 450, the discharging terminal 490, and the load 470, and a charging path includes the charging device 480, the charging terminal 491, the charging element 440, the current limit element 460, the discharging terminal 490, the discharging element 450, and the battery cell 430. Similar to embodiments described for FIGS. 2 and 3, the charging element 440, unlike the discharging element 450 that generally has to be rated for a comparatively large discharging current, may be a switching element that does not have a high current rating while securely preventing the discharging current from flowing through the charging element 440 during a discharging operation.

Figure 5:
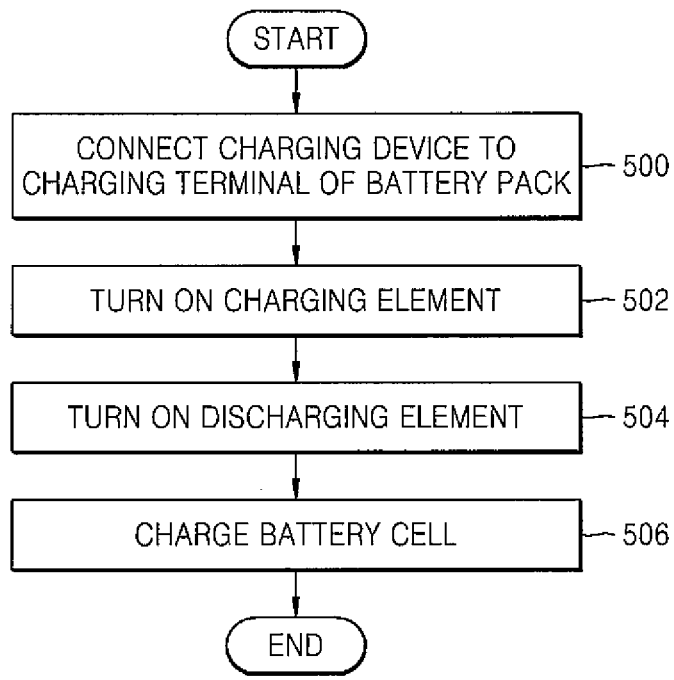
FIG. 5 is a flowchart illustrating a process for charging a battery pack according to another embodiment of the present invention.
Figure 6:
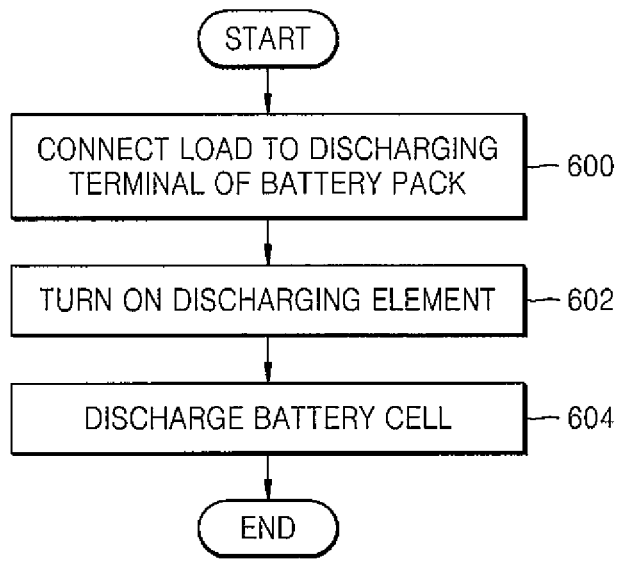
FIG. 6 is a flowchart illustrating a process for discharging a battery pack according to another embodiment of the present invention.

FIGS. 5 and 6 are flowcharts illustrating a process for charging a battery pack and a process for discharging the battery pack, respectively, according to other embodiments of the present invention. Referring to FIG. 5, in block 500, a charging device is connected to a charging terminal of the battery pack. In blocks 502 and 504, the charging element and discharging element are turned on. A charging path includes a charging device, a charging terminal, a charging element, a discharging terminal, a discharging element, and a battery cell. Optionally, a current limit element may be disposed between the charging element and the discharging terminal. Here, the current limit element does not cut off the charging current but allows the charging current to flow through the battery cell. The charging current that flows through the charging element and the discharging element during a charging operation is relatively small compared to the corresponding discharging current. Thus, an allowable current (e.g., current rating) of the charging element does not have to be high and the charging element may be implemented to correspond to the magnitude of the charging current of the charging device. In block 506, the battery cell is charged.

Referring to FIG. 6, in block 600, the load is connected to the discharging terminal of the battery pack. The discharging terminal is configured different from the charging terminal of FIG. 5. In other words, in order to separate charging and discharging paths from each other, the load is connected to the battery pack via an additional discharging terminal.

In blocks 602 and 604, the discharging element is turned on, and the battery cell is discharged. The discharging path includes the battery cell, the discharging element, the discharging terminal, and the load. Thus, when the load needs a comparatively large output current, for example, a maximum current required when an electric bike travels uphill, the output current may be supplied to the load without passing through the charging element. In order to securely prevent the discharging current from flowing through the charging element during the discharging operation, the current limit element may be disposed between the charging element and the discharging terminal in several embodiments. The current limit element may be a diode or a switch and prevents the discharging current from flowing through the charging element via the discharging terminal during the discharging operation.

As described above, according to several embodiments of the present invention, the battery pack includes an additional discharging element to separate the charging and discharging paths from each other. Thus, when a current is supplied to a load that requires a comparatively large output current, a large current does not flow through the charging element so that an allowable current (e.g., current rating) of the charging element may be reduced. Also, a discharging operation may be performed without discharging current passing through the charging element so that efficiency of output of the battery pack may be improved and the amount of heat-dissipation may be reduced.

Furthermore, the charging and discharging circuitry may be implemented so that a charging operation may be performed without separating the battery pack.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A battery pack, comprising:
    a battery group comprising at least one rechargeable battery and a common terminal, the battery group configured to be coupled to a load and/or a charger;
    a charge control switch configured to control current provided to the battery group;
    a discharge control switch configured to control current provided from the battery group; and a current limiting element connected to the charge control switch in series so as to prevent the current provided from the battery group from flowing through the charge control switch while a discharging current flows from the battery group to the load, wherein the battery group is configured to be coupled to the charger through both of the charge control switch and the discharge control switch, and wherein the battery group is configured to be coupled to the load through the discharge control switch and not through the charge control switch.

2. The battery pack of claim 1, wherein when the battery group is concurrently coupled to each of the load and the charger, a current path from the charger to the load is through the charge control switch and not through the discharge control switch.

3. The battery pack of claim 1, wherein the current limiting element is coupled between the discharge control switch and the charge control switch.

4. The battery pack of claim 3, wherein the current limiting element comprises a diode.

5. The battery pack of claim 3, wherein the current limiting element comprises a switch controlled by processing circuitry, the processing circuitry being configured to control the charge control switch and the discharge control switch to control charging and discharging of the battery group.

6. The battery pack of claim 1, wherein the charge control switch and the discharge control switch each comprise a field effect transistor.

7. The battery pack of claim 1, wherein a current rating of the charge control switch is less than a current rating of the discharge control switch.

8. The battery pack of claim 1, further comprising processing circuitry that is configured to:

switch-on the charge control switch and the discharge control switch while charging the battery group; and switch-on the discharge control switch and switch-off the charge control switch while discharging the battery group.

9. The battery pack of claim 8:

wherein a charging current flows through the charge control switch and the discharge control switch while charging, and wherein a discharging current is greater than the charging current.

10. The battery pack of claim 1, further comprising processing circuitry, which comprises an analog front end circuitry coupled to a processor, wherein the analog front end circuitry is configured to:

measure a voltage of the battery group; and charge and discharge the battery group by controlling the discharge control switch and the charge control switch based on at least one control signal from the processor.

11. A method for charging and discharging a battery group of a battery pack, the battery group comprising at least one rechargeable battery and a common terminal, the battery group being configured to be coupled to a load and/or a charger, the method comprising:

charging the battery group with a charging current that flows from the charger through a charge control switch and a discharge control switch to the battery group;

discharging the battery group with a discharging current provided from the battery group through the discharge control switch to the load; and limiting the discharging current with a current limiting element connected to the charge control switch in series so as to prevent the discharging current from flowing through the charge control switch while a discharging current flows from the battery group to the load, wherein the discharging current does not flow through the charge control switch while discharging the battery group.

12. The method of claim 11, further comprising providing a current path from the charger to the load through the charge control switch and not through the discharge control switch when the battery group is concurrently coupled to each of the load and the charger.

13. The method of claim 11, wherein the current limiting element is coupled between the discharge control switch and the charge control switch.

14. The method of claim 13, wherein the current limiting element comprises a diode.

15. The method of claim 14, wherein the current limiting element comprises a switch.

16. The method of claim 11, wherein the charge control switch and the discharge control switch each comprises a field effect transistor.

17. The method of claim 11, wherein a current rating of the charge control switch is less than a current rating of the discharge control switch.

18. The method of claim 11, further comprising measuring a voltage at the battery, wherein an operation of the charge control switch and an operation of the discharge control switch are based on the measured voltage.

* * * * *